United States Patent [19]

Takeuchi

[11] Patent Number: 5,078,588
[45] Date of Patent: Jan. 7, 1992

[54] STRINGINESS-PREVENTING PAD USED IN AN INJECTION MOLD

[75] Inventor: Hiroshi Takeuchi, Tokyo, Japan

[73] Assignee: Shinkoh Sellbic Co., Ltd., Tokyo, Japan

[21] Appl. No.: 588,262

[22] Filed: Sep. 26, 1990

[30] Foreign Application Priority Data

Sep. 27, 1989 [JP] Japan .............................. 1-113254[U]
Dec. 30, 1989 [JP] Japan .............................. 1-152288[U]

[51] Int. Cl.$^5$ .......................................... B29C 45/38
[52] U.S. Cl. .............................. 425/562; 264/328.9; 425/563
[58] Field of Search ............... 425/562, 563, 564; 264/328.9

[56] References Cited

U.S. PATENT DOCUMENTS 4,944,909 7/1990 Eckardt .......................... 264/328.9

FOREIGN PATENT DOCUMENTS 62-119212 7/1987 Japan .
63-50102 12/1988 Japan .

OTHER PUBLICATIONS

Webster's Ninth New Collegiate Dictionary, 1986 p. 469.

*Primary Examiner*—Timothy Heitbrink
*Attorney, Agent, or Firm*—Oblon, Spivak, McClelland, Maier & Neustadt

[57] ABSTRACT

A stringiness-preventing pad having a resin passage hole defined by partition leaves is interposed between a sprue bush and an injection cylinder nozzle so that the partition leaves are spread by the pressure of molten resin material being injected into a mold and elastically closed upon completion of injection. The resin material solidified in the sprue is prevented from stringing by virtue of the partition leaves when removing a molded object from the mold.

8 Claims, 5 Drawing Sheets

(A)

(B)

(C)

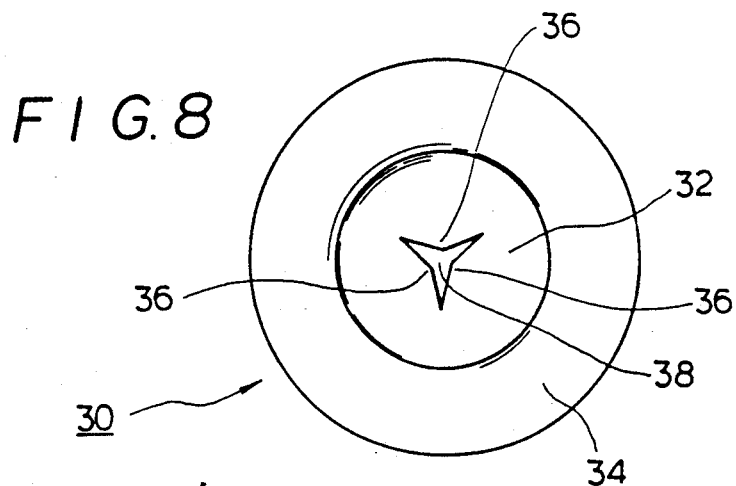
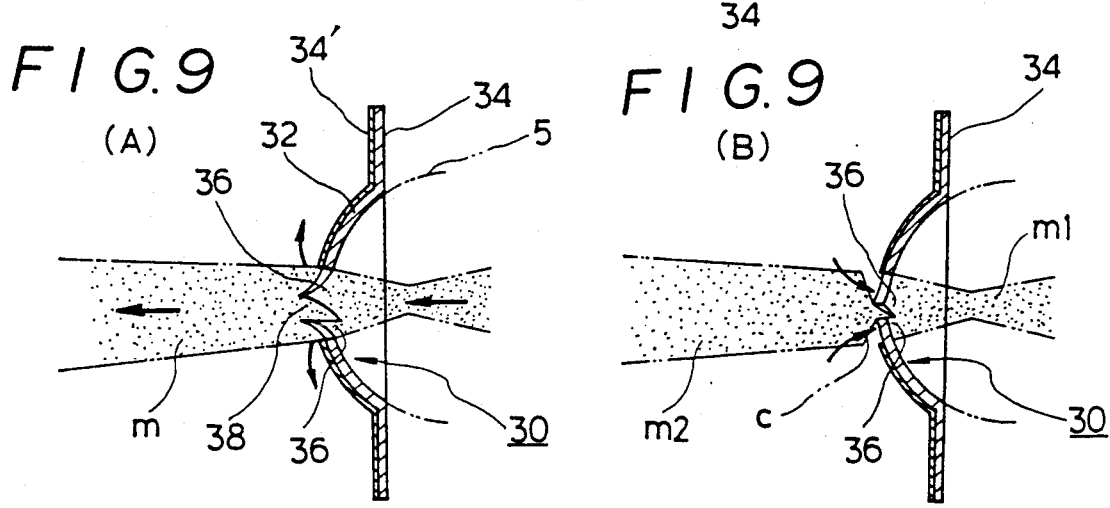
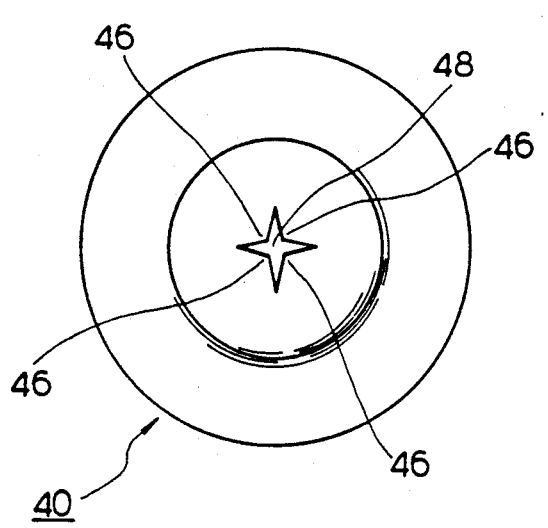
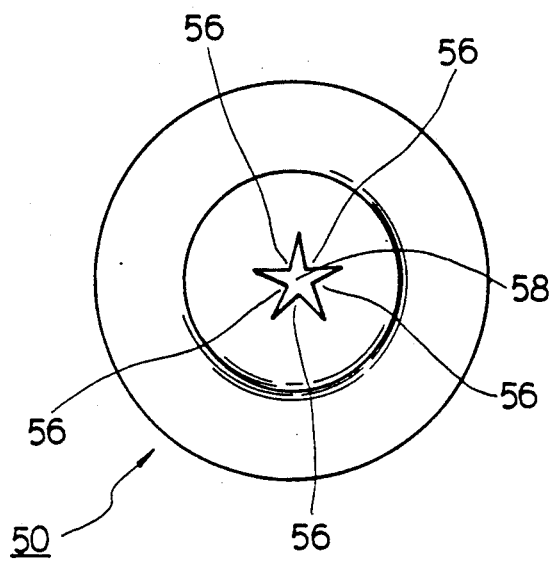

STRINGINESS-PREVENTING PAD USED IN AN INJECTION MOLD

BACKGROUND OF THE INVENTION

1. Field of the Invention

This invention relates to a stringiness-preventing pad attached to a mold in an injection molding machine for preventing a molded object from stringing when removing the molded object from the mold.

2. Description of the Prior Art

When a molded object is removed from a mold upon solidification of molten resin material injected into the mold through an injection cylinder nozzle of an injection molding machine, a sprue slug solidified in a sprue of the mold remains connected with the molten resin material in the cylinder nozzle through stringy molten resin. This phenomenon is the so-called "stringiness" inevitably caused by the viscosity of the molten resin material. To be specific, as shown in FIG. 1, the sprue slug s which is formed in a sprue 3 and connected with a desired object molded in the mold cavity of the mold 1 has incidentally a stringing part d dangling from the sprue slug. The stringing part d to be ultimately discarded is formed by the molten resin material in the injection cylinder nozzle which is stickily attached to the sprue slug s solidified in the sprue 3 when the sprue slug is removed from the mold 1 upon completion of one molding shot. The stringing part d entails problems such as difficulty in removing the united molded object and-sprue slug s from the mold 1 and misalignment at the parting face 7 formed between stationary and movable dies constituting the mold in mold-closing. In some cases the stringing part may possibly mar up the mold 1, thereby cause dimensional distortion or surface blemish on the molded object obtained finally obtained.

A conventional means has been proposed for cutting the stringing part attached to the sprue slug in Japanese U.M. Public Disclosure SHO 62(1987)-119212(A), which is provided with a slidable cutting plate capable of cutting out the stringing part. However, this conventional device disadvantageously is complicated in mechanism, impedes the continuity of injection molding and involves decrease of injection speed. Besides, the cutting plate of the conventional device frequently fails to remove the stringing part from the molded object.

Another prior art mold structure is disclosed in Japanese U.M. Publication SHO 63(1988)-50102(B), in which a metal thin plate being high in heat conductivity and having a fine hole communicating with the sprue is attached to a sprue bush so as to be held between the nozzle touching face of the sprue bush and the injection cylinder nozzle. The metal plate serves to quickly radiate the heat of the molten material injected into the sprue so that the molten material in the sprue is rapidly cooled and solidified to prevent the molten material in the sprue from thermally stretching. To remove the stringing part in this conventional mold structure, the molded object including the sprue slug is separated from the molten material in the cylinder nozzle at a contracted part formed by the fine hole bored in the metal plate by forcibly disconnecting the injection cylinder nozzle from the sprue bush. This conventional structure has a disadvantage in that the molten resin material would be reluctant to pass through the fine hole in the metal plate, resulting in short molding and decrease of injection speed.

Otherwise, a method for preventing stringiness by controlling injection pressure or providing a check valve at the nozzle tip of the injection cylinder nozzle can be envisaged. Nevertheless, a possible mechanism for practicing the aforenoted method would be complicated in structure awkward to handle and easily brings about a malfunction.

OBJECT OF THE INVENTION

One object of the present invention is to provide a stringiness-preventing pad capable of thoroughly preventing a desired molded object including a sprue slug from stringing by positively cutting off molten resin material in an injection cylinder nozzle.

Another object of this invention is to provide a pad capable of preventing stringiness, which is very simple in structure and can readily be applied to a common injection molding machine without the need to modify the molding machine.

SUMMERY OF THE INVENTION

To attain the objects described above according to this invention there is provided a stringiness-preventing pad interposed between a sprue bush and an injection cylinder nozzle, comprising a nozzle receiving member fitted to the sprue bush and having a resin passage hole defined by partition leaves disposed so as to spread by the pressure of molten resin material being injected. The partition leaves in the resin passage hole may be formed by radially cutting the center portion of the nozzle receiving member. The nozzle receiving member is made of elastic materials so as to elastically close the resin passage hole under normal condition and spread the hole when the molten resin material is injected.

By injecting the molten resin material from the injection cylinder nozzle into a mold, the partition leaves in the resin passage hole is spread by virtue of the molten resin material being injected into the mold. Then, the partition leaves elastically return to their original state to thereby close the resin passage hole and cut off continuity of the resin material flowing from the injection cylinder nozzle into the sprue. As a result, stringiness caused by the molten resin material in the injection cylinder nozzle which viscidly sticks to a sprue slug shaped by the resin material solidified in the sprue can be prevented.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a front view showing a second embodiment of the pad according to this invention;

FIGS. 9A through 9B are schematic side views showing the stringiness-principle function of the pad of FIG. 8;

FIG. 10 is a front view showing a third embodiment of this invention;

FIG. 11 is a front view showing a fourth embodiment of this invention; and

DESCRIPTION OF THE PREFERRED EMBODIMENTS

With reference to FIG. 2 through FIG. 7C, the first embodiment of the stringiness-preventing pad 10 according to this invention will be described hereinafter.

Figure 1:
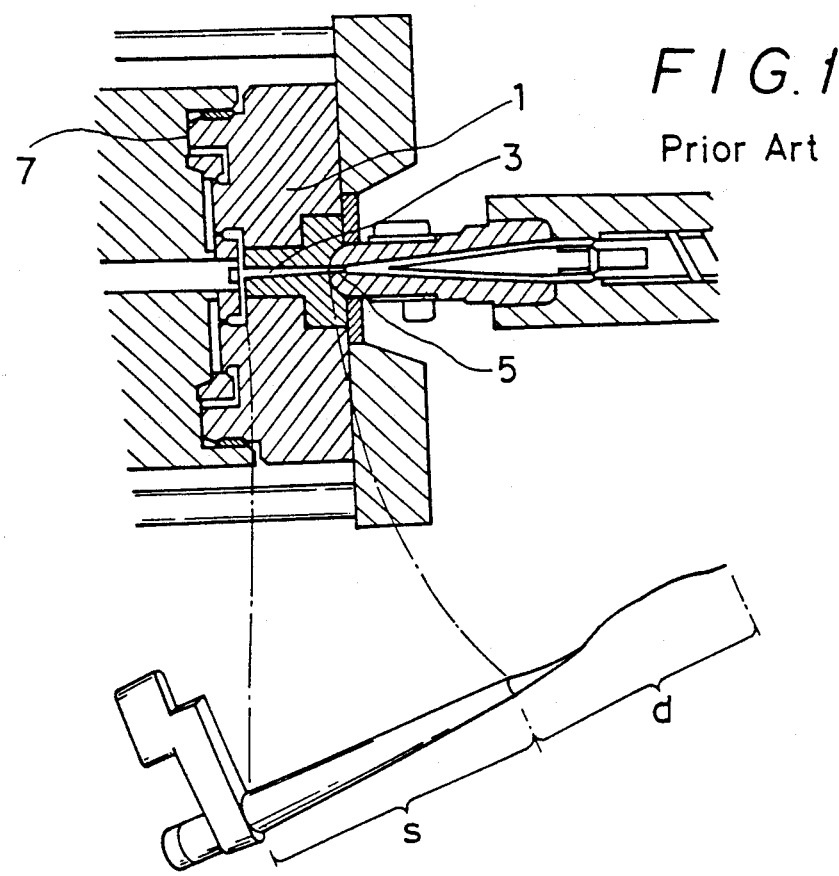
FIG. 1 is an explanatory diagram schematically illustrating the stringiness phenomenon occurring in a conventional injection molding machine.
Figure 2:
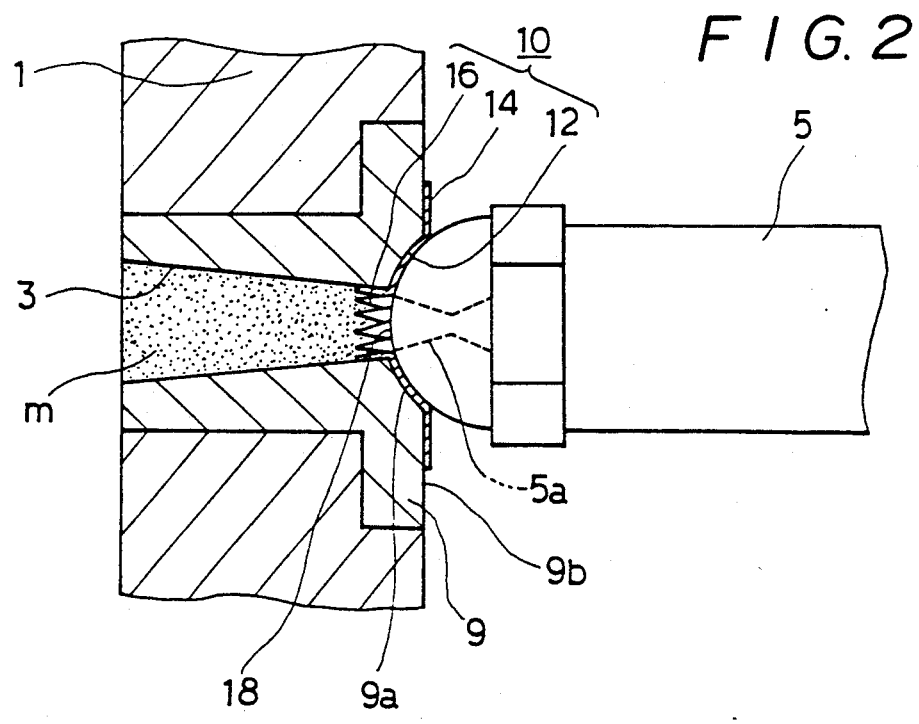
FIG. 2 is a sectional side view showing a first embodiment of the stringiness-preventing pad according to this invention which is applied to the injection molding machine.
Figure 3:
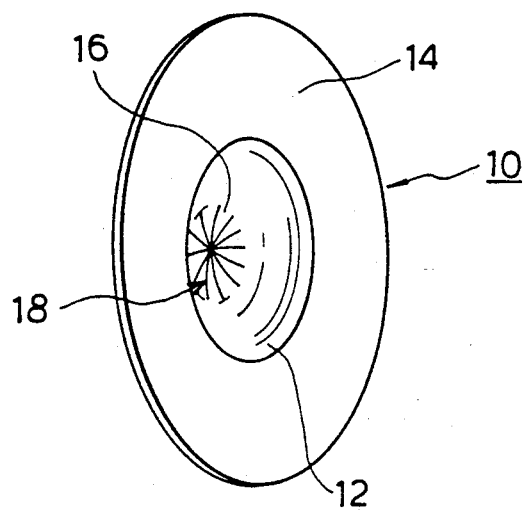
FIG. 3 is a perspective diagram showing the pad of FIG. 2.
Figure 4:
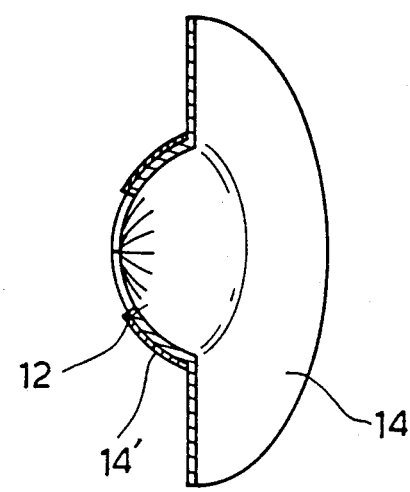
FIG. 4 is a sectional perspective diagram of FIG. 3.

The stringiness-preventing pad 10 is interposed between a nozzle touching face 9a of a sprue bush 9 and a nozzle tip of an injection cylinder nozzle 5 of an injection molding machine as illustrated in FIG. 1. As a matter of fact, the pad 10 is fixedly fitted to the sprue bush 9. As shown in FIG. 2 through FIG. 4, the pad 10 comprises a nozzle receiving member 12 which is shaped in accord with the concave of the nozzle touching face 9a of the sprue bush 9 so as to be in intimate contact with the nozzle touching face 9a, and a flange portion 14 which is attached to the end face 9b of the sprue bush 9. The nozzle receiving member 12 has a resin passage hole 18 which communicates with a sprue 3 bored in the sprue bush 9 and partition leaves 16 disposed within the resin passage hole 18. The partition leaves 16 are formed by radially cutting the center portion of the nozzle receiving member 12 into wedges so that the resin passage hole 18 is defined by opening the partition leaves 16 by the force of molten resin material being injected into a mold cavity in a mold through the sprue 3. In other words, the partition leaves 16 extend radially inwardly from the inner edge of the resin passage hole 18 and are kept in their closed state under normal condition so as to close the resin passage hole 18. The nozzle receiving member 12 is made of metallic materials such as stainless steel having moderate elasticity and high abrasion resistance.

Figure 5:
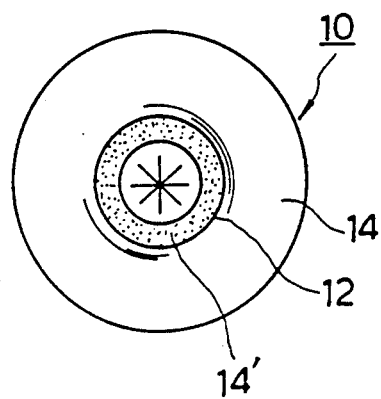
FIG. 5 is a front view showing the pad of FIG. 2.
Figure 6:
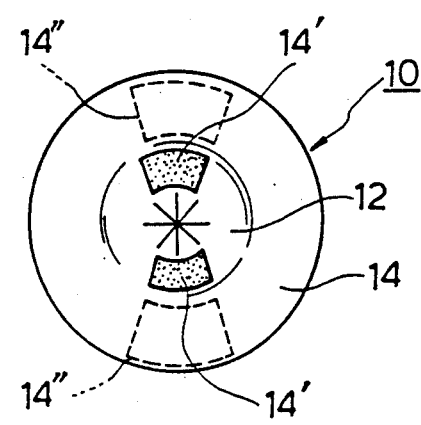
FIG. 6 is a front view of a modified form of the pad shown in FIG. 2.
Figure 7:
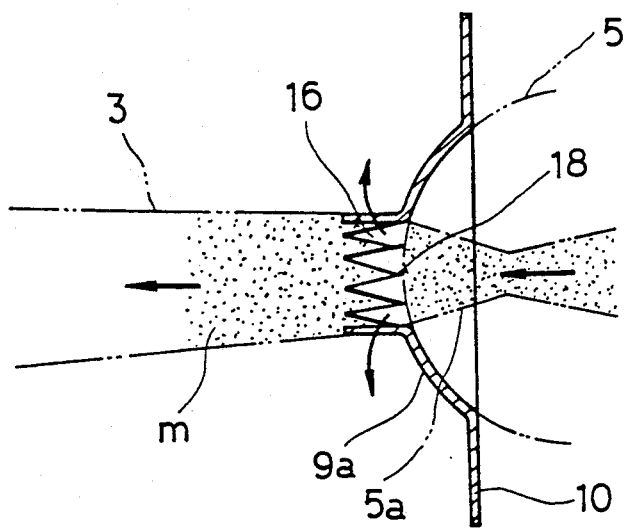
FIGS. 7A through 7C are schematic side views showing the stringiness-preventing function of the pad according to this invention.
Figure 7:
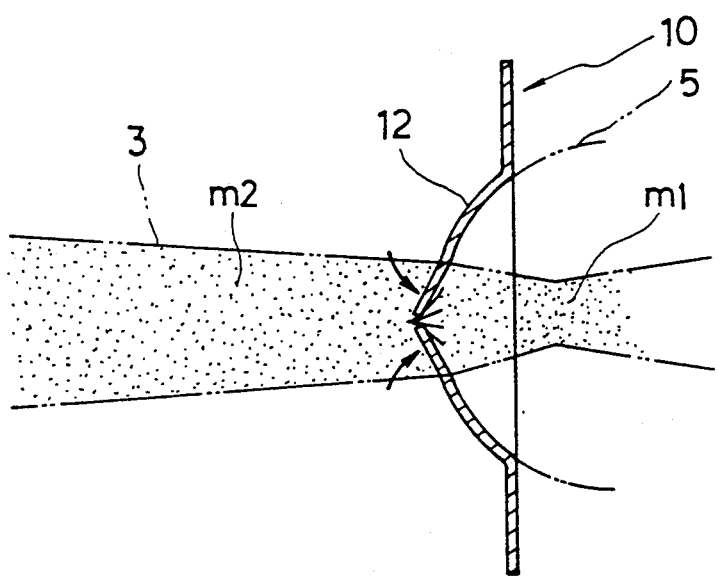
Figure 7:
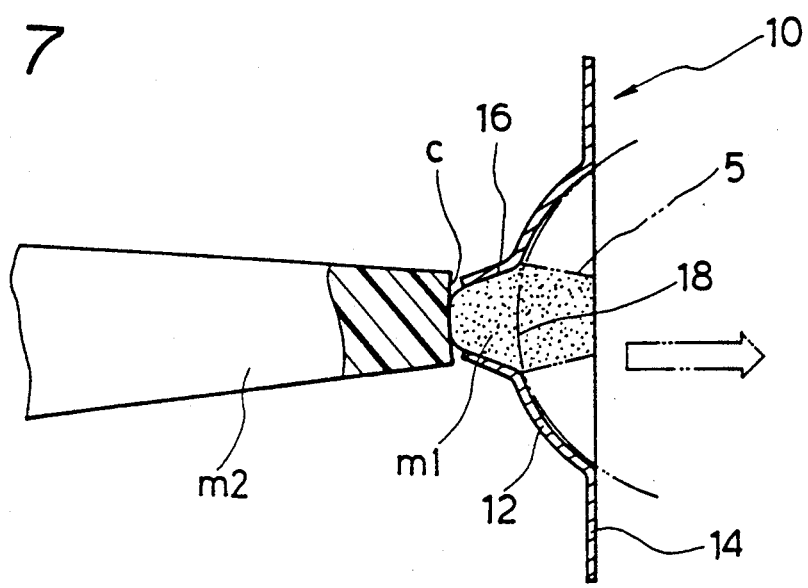

The stringiness-preventing pad 10 is detachably fixed onto the sprue bush 9 with one or more fixing means 14'. As the fixing means, a double-faced adhesive tape formed in a ring shape can be used as shown in FIG. 5. Or, a plurality of double-faced adhesive tape pieces may be attached inside the nozzle receiving member 12 in order to fix the pad 10 onto the sprue bush as shown in FIG. 6. The double-faced adhesive tape pieces may of course be arranged on the flange portion 14 as indicated by reference numeral 14" in FIG. 6 for the same purpose. Otherwise, the pad 10 may be in its entirety or in part formed of a magnetic substance so as to be magnetically fixed onto the sprue bush 9. In any case, the structure for fixing the pad 10 onto the sprue bush 9 should not be understood as limitative.

Though the flange portion 14 extending outwardly from the outer edge of the nozzle receiving member 12 serves to readily attach the pad 10 onto the sprue bush 9, this flange portion is not necessarily constituent for this invention and may be omitted if circumstances require.

Next, the function of the stringiness-preventing pad 10 of this embodiment will be explained with reference to FIG. 7A through FIG. 7C.

At the outset, the pad 10 is attached to the sprue bush 9 with the fixing means 14' or any other possible means. In the state that the injection cylinder nozzle 5 is then thrust against the sprue bush 9 via the pad 10 so as to hold the pad 10 between the nozzle tip of the cylinder nozzle 5 and the nozzle touching face 9a of the sprue bush 9, molten resin material m is injected from the injection port 5a at the nozzle tip of the cylinder nozzle 5 into the mold cavity through the sprue 3. At this time, the partition leaves 16 are spread forwardly in the flowing direction of the injected molten resin material by the pressure of the molten resin material, to thereby open widely the resin passage hole 18. Thus, the molten resin material m is filled in the mold cavity without reducing the injection speed. (FIG. 7A)

Immediately after the molten resin material m is completely filled in the mold cavity and sprue, namely, when the flowing speed of the injected molten resin material becomes nearly zero, the partition leaves 16 elastically return to their original state to thereby close the resin passage hole 18, to thereby cut off continuity of the resin material filled in the passage from the injection port 5a to the sprue 3. (FIG. 7B)

Surge pressure which is inevitably caused reactively when the molten resin material is completely filled in the mold cavity slightly acts on the partition leaves 16 in the spread state. Consequently, the partition leaves are promptly closed in conjunction with the elastically restoring force of the partition leaves, to thereby contract the resin passage hole 18.

Thus, the resin part m1 left inside the injection cylinder nozzle 5 in the molten state thereof and the resin part m1 which is filled and solidified in the sprue 3 by cooling are divided by the closed partition leaves.

As a matter of course, the resin parts m1 and m2 are not necessarily separated completely by the partition leaves 16. That is to say, merely by constracting a boundary portion between the resin parts m1 and m2 to form a constracted part c therebetween as shown in FIG. 7C, the resin parts m1 and m2 can be thoroughly separated. At the frangible constracted part c, the solidified resin part (sprue slug) m2 is completely cut off from the molten resin part m1 when the injection cylinder nozzle 5 is evacuated from the sprue bush 9 upon shaping a desired molded object in the mold cavity and a sprue slug in the sprue 3. As will be understood from this, the elasticity of the partition leaves 16 need not necessarily be so strong. This means that the molten resin material can smoothly flow from the injection cylinder nozzle 5 into the sprue 3 without hindrance.

In addition, the stringiness-preventing pad 10 has a heat-insulating function to reduce heat-transfer from the injection cylinder nozzle 5 to the sprue bush 9, because the cylinder nozzle 5 does not come into direct contact with the sprue bush 9. Owing to the heat-insulating function, the resin material injected into the sprue 3 in the molten state is promptly cooled and solidified without being affected by the heat generated by the cylinder nozzle 5. Therefore, it becomes possible to maintain the most suitable condition in which the resin part m2 in the sprue 3 is promptly cooled to be solidified, while the resin part m1 in the cylinder nozzle 5 is kept molten appropriate. This suitable condition has an advantage that the molten resin part m1 and solidified resin part (sprue slug) m2 can be easily separated by evacuating the cylinder nozzle 5 from the sprue bush 9. As a result, the so-called "stringiness" can be prevented when the molded object is removed from the mold.

When the aforementioned pad 10 according to this invention was actually applied to an injection molding machine, the stringiness-preventing effect was confirmed for a long continuous time of about 60 hours. Both the sprue bush and injection cylinder nozzle were not damaged at all even after the pad was so worn out as to be exchanged. The desired effect of preventing the sprue slug from stringing was also obtained after the worn pad was exchanged for new one.

The stringiness-preventing pad according to this invention is simple in structure and therefore can be produced at a low cost and readily mounted and exchanged.

The stringiness-preventing pad 10 can easily be made of not only a metal plate as specified above, but also a shape memory alloy. The pad of the shape memory alloy can properly fulfill the desired function such that the partition leaves formed at the center portion of the pad are spread to open the resin passage hole by the injection pressure of the molten resin material injected into the mold, whereas they spontaneously contract with intense heat of the molten resin injected from the injection cylinder nozzle so as to close the resin passage hole. As a result, the molten resin in the injection cylinder nozzle and the solidified resin part (sprue slug) in the sprue are separated.

Although the partition leaves in the foregoing embodiment are formed by radially cutting the center portion of the nozzle receiving member into wedges, they can be formed even by various possible ways. Modified forms of the partition leaves are illustrated in FIG. 8 to FIG. 11.

FIG. 8 shows the second embodiment of the invention in which a stringiness-preventing pad 30 comprises a nozzle receiving member 32 having a substantially Y-shaped resin passage hole 38 defined by wedge-shaped partition leaves 36, and a flange portion 34. The pad 30 is fixed onto the sprue bush with fixing means 34 such as a double-faced adhesive tape as shown in FIG. 9A.

When molten resin material m is injected into a mold, the partition leaves 36 were spread by the force of the molten resin material being injected, to thereby permit the resin material to pass therethrough (FIG. 9A). Upon completion of injection, the partition leaves 36 elastically return to their original state to thereby narrow the resin passage hole 38 (FIG. 9B). Though the resin passage hole 38 is not entirely closed even when the partition leaves 36 assume its original state, it is sufficient to separate a molded object including a sprue slug m2 from the molten resin material m1 left in an injection cylinder nozzle, because of a frangible constracted part c formed by the partition leaves 38 which elastically contract. Consequently, the sprue slug shaped in the sprue can be thoroughly separated from the molten resin in the injection cylinder nozzle when removal of the molded object from the mold. Namely, occurrence of stringiness can be prevented.

In the third embodiment illustrated in FIG. 10, a stringiness-preventing pad 40 has a substantially cross-shaped resin passage hole 48 defined by four partition leaves 46. In the fourth embodiment in FIG. 11, a pad 50 has a substantially star-shaped resin passage hole 58 defined by five partition leaves 56. Either way, the desired effect of preventing the stringiness phenomenon can be achieved similarly to the second embodiment shown in FIG. 8.

Figure 12:
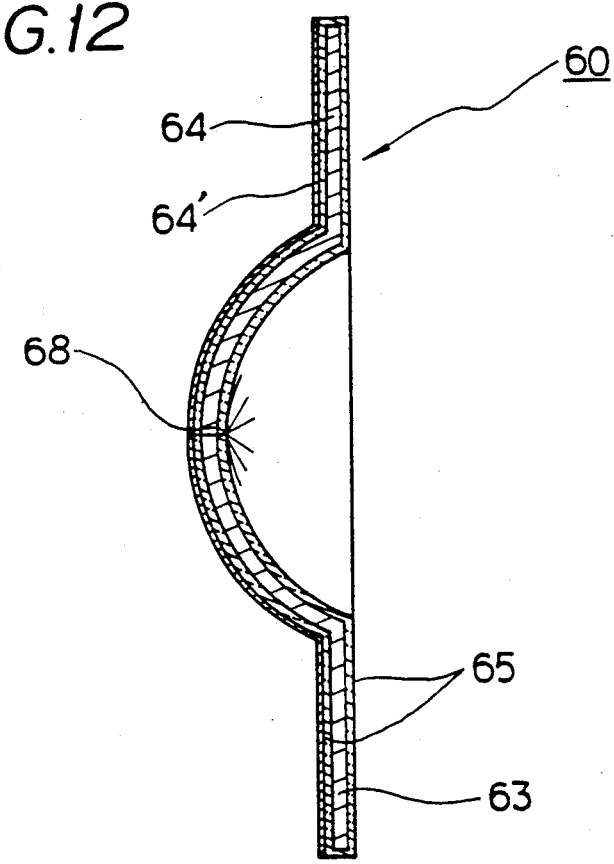
FIG. 12 is a sectional side view showing a fifth embodiment of this invention.

A stringiness-preventing pad 60 shown in FIG. 12 as the fifth embodiment comprises a pad substrate 63 made of a metal plate or the like, whose entire surface is coated with a heat-insulation layer 65 such as of fluorocarbon resin and ceramics. In the drawing, reference numeral 64 denotes a flange portion, 64' a fixing means such as a double-faced adhesive tape, and 68 a resin passage hole.

The pad 60 has an advantage that heat transfer from the injection cylinder nozzle to the sprue bush can be effectively controlled. Moreover, in a case of the fluorocarbon resin being used as the heat-insulation layer, the molten resin material and sprue slug which are in touch with the pad can easily be removed from the pad when the injection cylinder nozzle is evacuated from the sprue bush because of excellent release properties of the fluorocarbon resin. Thus, the stringiness phenomenon can be thoroughly prevented when the molded object is removed from the mold.

Though the both side surfaces of the pad 60 in this embodiment are entirely coated with the heat-insulation layer, only either one of the surfaces of the pad may however be coated.

As is plain from the foregoing description, by interposing the stringiness-preventing pad according to this invention between the sprue bush and the injection cylinder nozzle, stringiness phenomenon can be effectively prevented by virtue of the partition leaves formed in the pad, which are spread by the pressure of the molten resin material injected from the injection cylinder nozzle into the sprue and spontaneously contract upon completion of injection. The pad according to this invention has an outstanding advantage that it is very simple in structure and can be produced at a low price, and besides, can readily be applied to various types of injection molding machines without need for any modification in the machine.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. A stringiness-preventing pad having elasticity attached to a nozzle touching face of a sprue bush having a sprue communicating with a mold cavity in a mold so as to be interposed between the nozzle touching face and an injection cylinder nozzle in an injection molding machine, said pad comprising a nozzle receiving member fitted to the nozzle touching face and partition leaves formed in said nozzle receiving member for defining a resin passage hole communicating with the sprue, which partition leaves are spread to form said resin passage hole by force of molten resin material being injected from the injection cylinder nozzle into the sprue through said resin passage hole, and said partition leaves closed by their own elastically restoring force immediately after said molten resin material is completely filled in said mold cavity and sprue.

2. The pad according to claim 1, further comprising a flange portion extending outwardly from said nozzle receiving member.

3. The pad according to claim 2, further comprising one or more fixing means attached to at least one of said nozzle receiving member and flange portion for fixing said pad onto the sprue bush.

4. The pad according to claim 3, wherein said fixing means is a double-faced adhesive tape.

5. The pad according to claim 1, wherein said resin passage hole is formed in a substantially Y-shape.

6. The pad according to claim 1, wherein said resin passage hole is formed in a substantially cross shape.

7. The pad according to claim 1, wherein said resin passage hole is formed in a substantially star shape.

8. The pad according to claim 1, which is coated with a heat-insulation layer.

* * * * *